Figure 1:
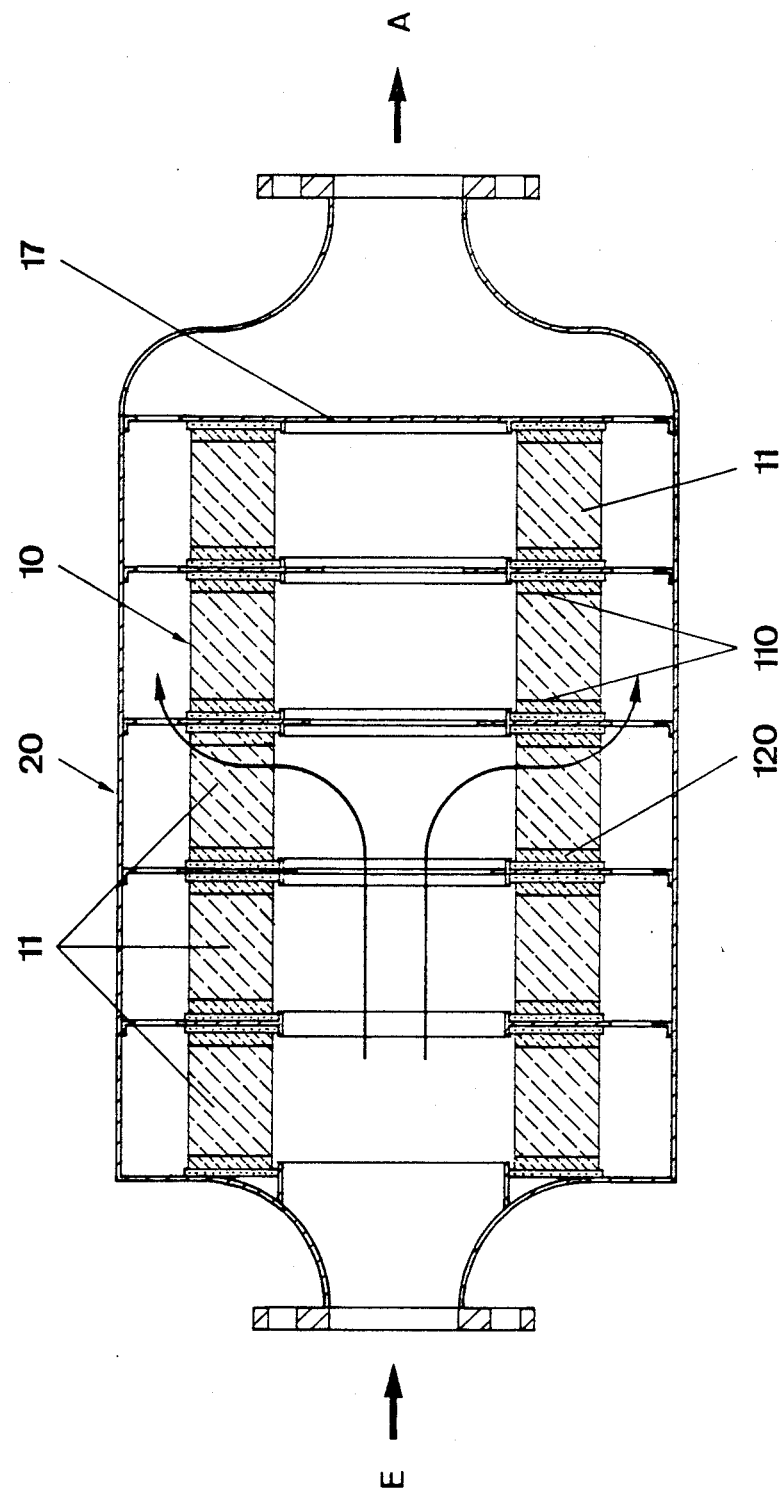

United States Patent [19]

Mizrah et al.

[11] Patent Number: 4,924,570
[45] Date of Patent: May 15, 1990

[54] FILTER FOR CLEANING EXHAUST GASES OF DIESEL ENGINES

[75] Inventors: Tiberiu Mizrah, Schaffhausen, Fed. Rep. of Germany; Albert Maurer, Thayngen; Jean-Pierre Gabathuler, Schaffhausen, both of Switzerland

[73] Assignee: Swiss Aluminium Ltd., Chippis, Switzerland

[21] Appl. No.: 333,305

[22] Filed: Apr. 5, 1989

Related U.S. Application Data

[62] Division of Ser. No. 264,265, Oct. 28, 1988.

[30] Foreign Application Priority Data

Nov. 18, 1987 [CH] Switzerland .................. 4504/87

[51] Int. Cl.⁵ ............................................. B23P 25/00
[52] U.S. Cl. .................................. 29/163.8; 29/458; 29/527.4
[58] Field of Search .............. 29/163.6, 163.7, 163.8, 29/458, 527.4; 51/290, 291; 55/482, 484, 498, 523, DIG. 30; 60/311

[56] References Cited

U.S. PATENT DOCUMENTS

| | | | |
|---|---|---|---|
| 3,147,097 | 9/1964 | Aguas | 55/276 |
| 3,708,858 | 1/1973 | Sasaki | 29/163.8 X |
| 3,811,845 | 5/1974 | Nakamura | 55/DIG. 30 |
| 3,847,577 | 11/1974 | Hansen | 55/498 |
| 4,363,196 | 12/1982 | Uhtenwoldt | 51/291 |
| 4,416,675 | 11/1983 | Montierth | 55/DIG. 30 |
| 4,419,113 | 12/1983 | Smith | 55/DIG. 30 |
| 4,420,316 | 12/1983 | Frost et al. | 29/163.8 X |
| 4,425,304 | 1/1984 | Kawata et al. | 55/DIG. 30 |
| 4,512,786 | 4/1985 | Sakurai et al. | 55/DIG. 30 |
| 4,728,423 | 3/1988 | Kuwajima | 55/484 |
| 4,732,594 | 3/1988 | Mizrah et al. | 60/311 |
| 4,736,545 | 4/1988 | Moss | 51/290 X |
| 4,814,564 | 1/1980 | Trainor | 181/230 |

FOREIGN PATENT DOCUMENTS

| | | |
|---|---|---|
| 0216729 | 4/1987 | European Pat. Off. |
| 2856471 | 8/1980 | Fed. Rep. of Germany |
| 3217357 | 11/1983 | Fed. Rep. of Germany |
| 700176 | 12/1979 | U.S.S.R. |

Primary Examiner—Timothy V. Eley
Assistant Examiner—Frances Chin
Attorney, Agent, or Firm—Bachman & LaPointe

[57] ABSTRACT

In a filter consisting of holoow cylindrical open-pore ceramic foam cylinder elements and an end plate made of gas-impermeable material, as an insert in a filter cup for cleaning exhaust gases of diesel engines, in which the exhaust gases flow through the active filter section essentially perpendicularly to the cylinder axis, bending moments which lead to breakage of the ceramic foam cylinder elements occur during fitting of the elements due to lack of surface evenness and plane-parallelism of the end faces. A filter of the aforementioned kind, in which the end faces of the ceramic foam cylinder elements are provided with temperature-resistant and thermal shock-resistant layers of material which are plastic at room temperature, avoids the bending moments.

4 Claims, 2 Drawing Sheets

FILTER FOR CLEANING EXHAUST GASES OF DIESEL ENGINES

This is a division of application Ser. No. 264,265 filed Oct. 28, 1988.

The present invention relates to a filter consisting of hollow cylindrical open-pore ceramic foam cylinder elements and an end plate made of gas-impermeable material, as an insert in a filter cup for cleaning exhaust gases of diesel engines, in which the exhaust gases flow through the active filter section essentially perpendicularly to the cylinder axis.

Filters of the aforementioned kind are well known.

When fitting the hollow cylindrical open-pore ceramic foam cylinder elements in these filters, it turned out that absolute surface evenness and plane-parallelism of the end faces of the ceramic elements is necessary, as otherwise any bending moments which occur lead to breaking of the ceramic foam before reaching the necessary initial axial mechanical tension. The initial mechanical tension is usually produced while the filter is in use by the thermal expansion of the expanding mats disposed between the ceramic foam cylinder elements, or further intensified by using conventional mechanical tensioning means.

The necessary surface evenness and plane parallelism of the two end faces of a ceramic foam cylinder element is not achieved by conventional sinter burning of the ceramic foam. Various possible solutions are available for meeting the requirements made of the ceramic foam cylinder elements, for example, regrinding or elastic post-deformation by afterburning with simultaneous plane-parallel weighting of the end faces of the ceramic foam cylinder element.

Regrinding has the disadvantage that the delicate ceramic webs break off at least partially, or completely break up, during the grinding process, so that filter efficiency in this region is impaired. Afterburning in the manner just mentioned is not acceptable on account of the high expenditure and associated costs.

In view of the circumstances, the inventors set themselves the object of providing a filter of the kind mentioned hereinbefore, in which ceramic foam cylinder elements with level and plane-parallel end faces are used, so that bending moments do not arise, and to specify a method which allows manufacture of filters of this kind.

According to the invention, the foregoing object is achieved by a filter consisting of hollow cylindrical open-pore ceramic foam cylinder elements and an end plate made of gas-impermeable material, as an insert in a filter cup for cleaning exhaust gases of diesel engines, in which the exhaust gases flow through the active filter section essentially perpendicularly to the cylinder axis, characterized in that on the end faces of the ceramic foam cylinder elements are located temperature-resistant and thermal shock-resistant layers of material which are plastic at room temperature. Advantageous developments of the filter according to the invention are characterised by the layers of material consisting of refractory cement mortar and the layers of material being impermeable to exhaust gases.

Furthermore, the partial object relating to manufacture of a filter of the kind according to the invention is achieved by a method characterized in that before assembly of the ceramic foam cylinder elements, plastic layers of material are applied to the end faces thereof, levelled until plane-parallel, dried and burned at 1000° to 1300° C. and thus bonded to the material of the ceramic foam cylinder elements. Further embodiments of the method according to the invention are characterised by the layers of material being reground after burning. In addition, the layers of material may be applied to the unburned ceramic foam cylinder elements. In addition, the layers of material may be applied to the end faces of the ceramic cylinder elements which have already been strenghtened with intrinsic ceramics.

Figure 2:
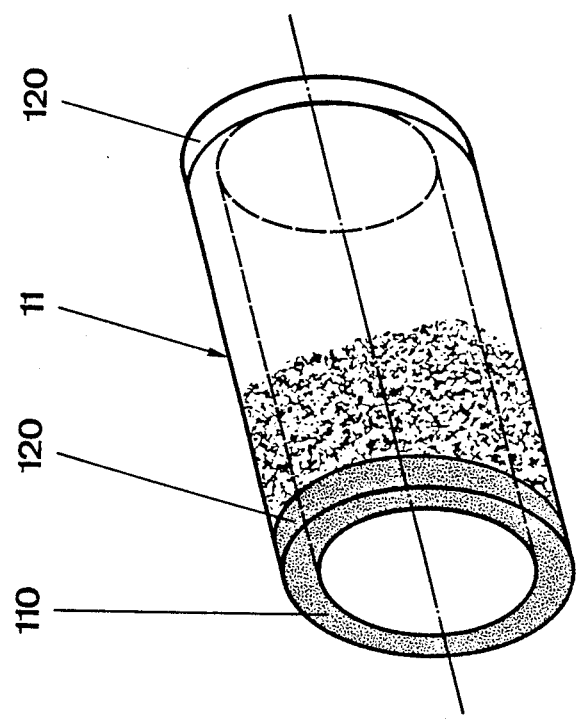

Further advantages, characteristics and details of the filter according to the invention are apparent from the drawings; these show schematically:

FIG. 1 a longitudinal section through a filter cup with filter according to the invention, and FIG. 2 a longitudinal section through a ceramic foam cylinder element.

The filter 10 consists of a system of several relatively short ceramic foam cylinder elements 11 which are arranged axially in a filter cup 20 having an end plate 17 made of gas-impermeable material, an inlet side E and an outlet side A. Exhaust gases enter the inlet, flow in the direction of the arrows through the ceramic foam elements and exit the outlet. A ceramic foam cylinder element 11 comprises on each end face 110 a temperature-resistant and thermal shock-resistant layer of material 120 which is plastic at room temperature. This layer of material preferably consists of a refractory cement mortar and is impermeable to exhaust gases of diesel engines.

The end faces 110 can be prestrengthened by intrinsic ceramics, which has the particular advantage that the compression which holds the elements 11 essentially in the axial direction can be applied to a particularly high extent.

The ceramic foam cylinder elements 11 can be assembled directly into a filter after application and plane-parallel levelling of the layers of material, if necessary after an initial drying process, wherein during initial use of the filter for cleaning the exhaust gases of diesel engines, on account of the elevated temperature the layers of material solidify themselves. But is more advantageous to manufacture the filter by the method characterized in that before assembly of the ceramic foam cylinder elements 11, plastic layers of material 120 are applied to the end faces 110 thereof, levelled until plane-parallel, dried and burned at 1000° to 1300° C. and thus bonded to the material of the ceramic foam cylinder elements. In this way each individual ceramic foam cylinder element 11 can be checked before fitting in the filter, and if necessary the layers of material can be adjusted to the required surface evenness and plane parallelism by regrinding.

We claim:

1. A method for preparing a filter assembly comprising: providing a plurality of hollow cylindrical open-pore ceramic foam cylinder elements having opposed end faces; strengthening the end faces of the ceramic foam cylinder elements with intrinsic ceramics; applying a layer of plastic material to the end faces of each cylinder element each of, said plastic layers being a temperature-resistant and thermal shock-resistant layer which is plastic at room temperature; leveling said material until all layers are plane-parallel; drying and burning said cylinder elements with said plastic material thereon at a temperature between 1000°–1300° C. so as to bond the material to the end faces of the cylinder elements; providing a filter cup having an inlet and an outlet and an end plate of gas-impermeable material disposed between said inlet and said outlet; arranging said cylinder elements axially in said filter cup with the end faces of one cylinder element adjacent to the other end face of another cylinder element so that a gaseous stream entering the inlet passes through the cylinder elements around said end plate and out said outlet.

2. Method according to claim 1 including grinding said plastic layers after burning.

3. Method according to claim 1 wherein said plastic layers each comprises a refractory cement mortar.

4. Method according to claim 3 wherein said plastic layers are gas-impermeable.

* * * * *

UNITED STATES PATENT AND TRADEMARK OFFICE
CERTIFICATE OF CORRECTION

PATENT NO. : 4,924,570

DATED : May 15, 1990

INVENTOR(S) : Tiberiu Mizrah et al.

It is certified that error appears in the above-identified patent and that said Letters Patent is hereby corrected as shown below:

On the cover page, under the heading ABSTRACT, line 1, change "holoow" to --hollow--.

In Column 2, line 42, after "But" insert --it--.

In Column 2, claim 1, line 61, delete "," after "of" and insert a --,-- after "element".

Signed and Sealed this

Sixth Day of August, 1991

Attest:

HARRY F. MANBECK, JR.

*Attesting Officer*

*Commissioner of Patents and Trademarks*